United States Patent
O'Donnell et al.

(10) Patent No.: US 12,163,548 B2
(45) Date of Patent: Dec. 10, 2024

(54) SELF-CLINCHING FASTENER

(71) Applicant: RB&W MANUFACTURING LLC, Streetsboro, OH (US)

(72) Inventors: Marc Andrew O'Donnell, Burlington (CA); Michael Da Costa, Orangeville (CA)

(73) Assignee: RB&W Manufacturing LLC, Streetsboro, OH (US)

( * ) Notice: Subject to any disclaimer, the term of this patent is extended or adjusted under 35 U.S.C. 154(b) by 153 days.

(21) Appl. No.: 17/822,528

(22) Filed: Aug. 26, 2022

(65) Prior Publication Data

US 2024/0068500 A1 Feb. 29, 2024

(51) Int. Cl.
*F16B 37/06* (2006.01)

(52) U.S. Cl.
CPC ............ *F16B 37/068* (2013.01); *F16B 37/06* (2013.01)

(58) Field of Classification Search
CPC ........ F16B 35/065; F16B 37/00; F16B 37/06; F16B 37/068; B23P 19/062; Y10S 411/967
USPC ........ 411/172–173, 179, 180, 183, 427, 937, 411/967
See application file for complete search history.

(56) References Cited

U.S. PATENT DOCUMENTS

| | | |
|---|---|---|
| 2,096,335 A | 10/1937 | Nicholas |
| 3,053,300 A | 9/1962 | Quinto |
| 3,640,326 A | 2/1972 | Brown |
| 3,811,171 A | 5/1974 | Grube |
| 3,878,599 A | 4/1975 | Ladouceur et al. |
| 4,690,599 A | 9/1987 | Shinjo |
| 5,067,224 A | 11/1991 | Muller |
| 5,340,251 A | 8/1994 | Takahashi et al. |
| 5,549,430 A | 8/1996 | Takahashi et al. |
| 5,743,691 A | 4/1998 | Donovan |
| 6,021,562 A | 2/2000 | Boster et al. |
| D437,211 S | 2/2001 | Pamer et al. |
| D440,865 S | 4/2001 | Pamer et al. |

(Continued)

FOREIGN PATENT DOCUMENTS

| | | |
|---|---|---|
| CN | 101280352 A | 10/2008 |
| CN | 103233960 A | 8/2013 |

(Continued)

OTHER PUBLICATIONS

International Search Report and Written Opinion issued in corresponding application, PCT/US2022/075499; mailing date: May 23, 2023.

*Primary Examiner* — Roberta S Delisle
(74) *Attorney, Agent, or Firm* — Pearne & Gordon LLP

(57) ABSTRACT

A self-clinching fastener for attachment to a plastically deformable metal substrate includes a body portion with a central axis, the body portion has an annular-shaped surface extending in a direction perpendicular to the central axis The annular-shaped surface includes a first annular face, a second annular face, and a third annular face. The third annular face lies on an imaginary horizontal plane. A punch portion extends from the body portion. A plurality of spaced apart lugs encircle the punch portion. The first annular face extends from an outer peripheral surface of the punch portion in a radially outwards direction, and the second annular face is radially disposed between the first annular face and the third annular face. One of the lugs declines to the second annular face.

20 Claims, 5 Drawing Sheets

(56) References Cited

U.S. PATENT DOCUMENTS

| | | | |
|---|---|---|---|
| 6,220,804 B1 * | 4/2001 | Pamer | F16B 37/068 |
| | | | 411/188 |
| D448,659 S | 10/2001 | Pamer et al. | |
| D448,660 S | 10/2001 | Pamer et al. | |
| D454,057 S | 3/2002 | Pamer et al. | |
| D454,484 S | 3/2002 | Pamer et al. | |
| D457,054 S | 5/2002 | Pamer et al. | |
| 6,409,444 B2 | 6/2002 | Pamer et al. | |
| 6,712,370 B2 | 3/2004 | Kawada et al. | |
| 7,374,382 B2 * | 5/2008 | Bentrim | F16B 37/068 |
| | | | 411/180 |
| 7,383,624 B2 | 6/2008 | Wojciechowski et al. | |
| D613,596 S | 4/2010 | Mangapora | |
| 7,740,436 B2 | 6/2010 | Pamer | |
| 8,062,141 B2 | 11/2011 | Pamer | |
| 8,261,591 B2 | 9/2012 | Hielscher | |
| 8,328,485 B2 | 12/2012 | Babej et al. | |
| 8,622,672 B2 * | 1/2014 | Babej | F16B 37/068 |
| | | | 411/179 |
| 8,734,071 B2 * | 5/2014 | Babej | B21K 1/46 |
| | | | 411/180 |
| 8,839,486 B2 * | 9/2014 | Diehl | B21K 1/60 |
| | | | 411/501 |
| 8,888,429 B2 | 11/2014 | Pamer et al. | |
| 8,931,160 B2 | 1/2015 | Shinjo | |
| 8,931,990 B2 * | 1/2015 | Gardstam | B23P 19/062 |
| | | | 411/180 |
| 8,979,455 B2 | 3/2015 | Burton | |
| 9,132,464 B2 | 9/2015 | Takacs et al. | |
| 9,322,424 B2 | 4/2016 | Pamer et al. | |
| 9,322,426 B2 | 4/2016 | Thomas | |
| 9,400,005 B2 | 7/2016 | Osborn et al. | |
| 9,574,602 B2 | 2/2017 | Burton | |
| 9,849,549 B2 | 12/2017 | Diehl et al. | |
| 11,209,040 B2 * | 12/2021 | O'Donnell | F16B 37/068 |
| 11,773,894 B2 * | 10/2023 | O'Donnell | F16B 37/068 |
| | | | 411/179 |
| 2001/0010789 A1 * | 8/2001 | Pamer | F16B 37/068 |
| | | | 411/179 |
| 2005/0076492 A1 | 4/2005 | Goodsmith et al. | |
| 2005/0147481 A1 | 7/2005 | Wojciechowski et al. | |
| 2006/0099047 A1 | 5/2006 | Bentrim | |
| 2006/0251489 A1 | 11/2006 | Denham et al. | |
| 2008/0107499 A1 | 5/2008 | Denham et al. | |
| 2009/0056403 A1 | 3/2009 | Chanko | |
| 2011/0211932 A1 * | 9/2011 | Babej | F16B 39/282 |
| | | | 411/188 |
| 2012/0142440 A1 | 6/2012 | Babej et al. | |
| 2012/0219377 A1 | 8/2012 | Pamer et al. | |
| 2013/0149067 A1 | 6/2013 | Shinjo | |
| 2013/0185917 A1 | 7/2013 | Diehl et al. | |
| 2013/0185921 A1 | 7/2013 | Diehl et al. | |
| 2013/0302107 A1 | 11/2013 | Burton | |
| 2013/0327453 A1 | 12/2013 | Takacs et al. | |
| 2014/0248104 A1 * | 9/2014 | Tanaka | F16B 37/068 |
| | | | 411/427 |
| 2014/0338802 A1 | 11/2014 | Okita et al. | |
| 2015/0023762 A1 | 1/2015 | Pamer et al. | |
| 2015/0322994 A1 * | 11/2015 | Mangapora | F16B 37/065 |
| | | | 411/180 |
| 2016/0221069 A1 | 8/2016 | Diehl et al. | |
| 2016/0298204 A1 | 10/2016 | Thomas | |
| 2020/0217350 A1 | 7/2020 | Donovan | |
| 2021/0018032 A1 | 1/2021 | O'Donnell | |

FOREIGN PATENT DOCUMENTS

| | | |
|---|---|---|
| DE | 102012012518 A1 | 12/2013 |
| DE | 10213218605 A1 | 3/2015 |
| EP | 2618009 B1 | 6/2016 |
| EP | 2618010 B1 | 6/2016 |
| GB | 2401661 B | 11/2004 |
| JP | 2002-257123 A | 9/2002 |
| JP | 2005515379 A | 5/2005 |
| KR | 1020140073388 A | 6/2014 |
| KR | 10-2094175 B1 | 3/2020 |
| WO | 02/070907 A1 | 9/2002 |
| WO | 2021/010959 A1 | 1/2021 |

* cited by examiner

SELF-CLINCHING FASTENER

CROSS-REFERENCE TO RELATED APPLICATIONS

None

FIELD OF THE INVENTION

This application relates generally to self-attaching fasteners, and more particularly, clinch nuts.

BACKGROUND OF THE INVENTION

Self-attaching fasteners are used in many industries such as, for example, the automotive and appliance industries to secure various components to metal panels. When clinch nuts are attached to the metal panels, screws or bolts are threaded into the clinch nuts and tightened to prescribed torque values. During installation, the clinch nuts must have sufficient rotational resistance to keep them from rotating relative to the metal panels when the screws are inserted and tightened. During service, the clinch nuts must have sufficient pull-through resistance to keep them from pulling out of the metal panel when external forces such as, for example, vibration or other tensile forces are applied.

A clinch nut typically includes a central pilot or punch portion which at least partially extends into an opening in a metal plate or panel. When the clinch nut is self-piercing, the central pilot portion cooperates with tooling to form the opening in the metal panel when attaching the clinch nut to the metal panel. The clinch nut is attached to the metal panel by a die member which forms a mechanical interlock between the clinch nut and the metal panel. Generally, the die member is a reflective die, having corresponding shapes to that of the clinch nut. More specifically, such reflective die members typically include a ridge that promotes deformation of the metal panel about the opening into an annular groove of the clinch nut which encircles the pilot portion and/or deforms the pilot portion of the clinch nut over the metal panel to entrap the metal panel. For such conventional applications, twelve tons of force (or more) is required to materially connect the clinch nut and the metal panel. Further, the amount of force used and the general configuration of the reflective die often results in the reflective die failing (i.e., breaking, deforming, etc.) between 100-1,000 uses. In particular, failing generally occurs at the ridge of the reflective die, as that element repeatedly applies sufficient force to separate metal panels, in succession, to affix respective clinch nuts thereto.

Accordingly, there is a need in the art for an improved clinch nut which can be reliably and consistently attached to a metal panel, having sufficient push-out strength, sufficient rotational resistance, and promote increased longevity of tooling (e.g., the die member). Furthermore, there is a need for the clinch nut to be relatively inexpensive to produce and relatively easy to use.

BRIEF SUMMARY OF THE INVENTION

In accordance with one aspect, there is provided a self-clinching fastener for attachment to a plastically deformable metal substrate. The self-clinching fastener includes a body portion with a central axis. The body portion includes an outer peripheral surface extending in a direction of the central axis, and an annular-shaped surface extending in a direction perpendicular to the central axis. The annular-shaped surface includes a first annular face, a second annular face, and a third annular face. The third annular face lies on an imaginary horizontal plane, and the first and second annular faces define a rim that projects away from the imaginary horizontal plane in the direction of the central axis.

A punch portion is coaxial with the central axis and extends from the body portion such that the annular-shaped surface encircles the punch portion. The punch portion includes an outer peripheral surface extending in the direction of the central axis. A plurality of spaced apart lugs encircle the punch portion and axially project outwards from the annular-shaped surface. One of the lugs declines, relative to the imaginary horizontal plane, in a radially outwards direction of the self-clinching fastener. The first annular face extends from the outer peripheral surface of the punch portion in the radially outwards direction. The second annular face is radially disposed between the first annular face and the third annular face, and said one of the lugs declines to the second annular face.

In accordance with another aspect, there is provided a self-clinching fastener for attachment to a plastically deformable metal substrate. The self-clinching fastener includes a body portion with a central axis. The body portion includes an outer peripheral surface extending in a direction of the central axis, and an annular-shaped surface extending in a direction perpendicular to the central axis. The annular-shaped surface includes a first annular face, a second annular face, and a third annular face. The third annular face lies on an imaginary horizontal plane, and the first and second annular faces define a rim that projects away from the imaginary horizontal plane in the direction of the central axis.

A punch portion is coaxial with the central axis and extends from the body portion such that the annular-shaped surface encircles the punch portion. The punch portion includes an outer peripheral surface extending in a direction of the central axis and has a cylindrical profile that resides on an imaginary circumferential plane. A plurality of spaced apart lugs encircle the punch portion and axially project outwards from the annular-shaped surface. One of the lugs declines, relative to the imaginary horizontal plane, in a radially outwards direction of the self-clinching fastener, The first annular face extends from the outer peripheral surface of the punch portion in the radially outwards direction, and the second annular face is radially disposed between the first annular face and the third annular face. The first annular face is planar in cross-section and is angled with respect to the imaginary horizontal plane. The second annular face has a concave shape in cross-section such that the second annular face continuously curves towards the imaginary horizontal plane in the radially outwards direction. Said one of the lugs declines to the second annular face.

DESCRIPTION OF EXAMPLE EMBODIMENTS

Figure 1:
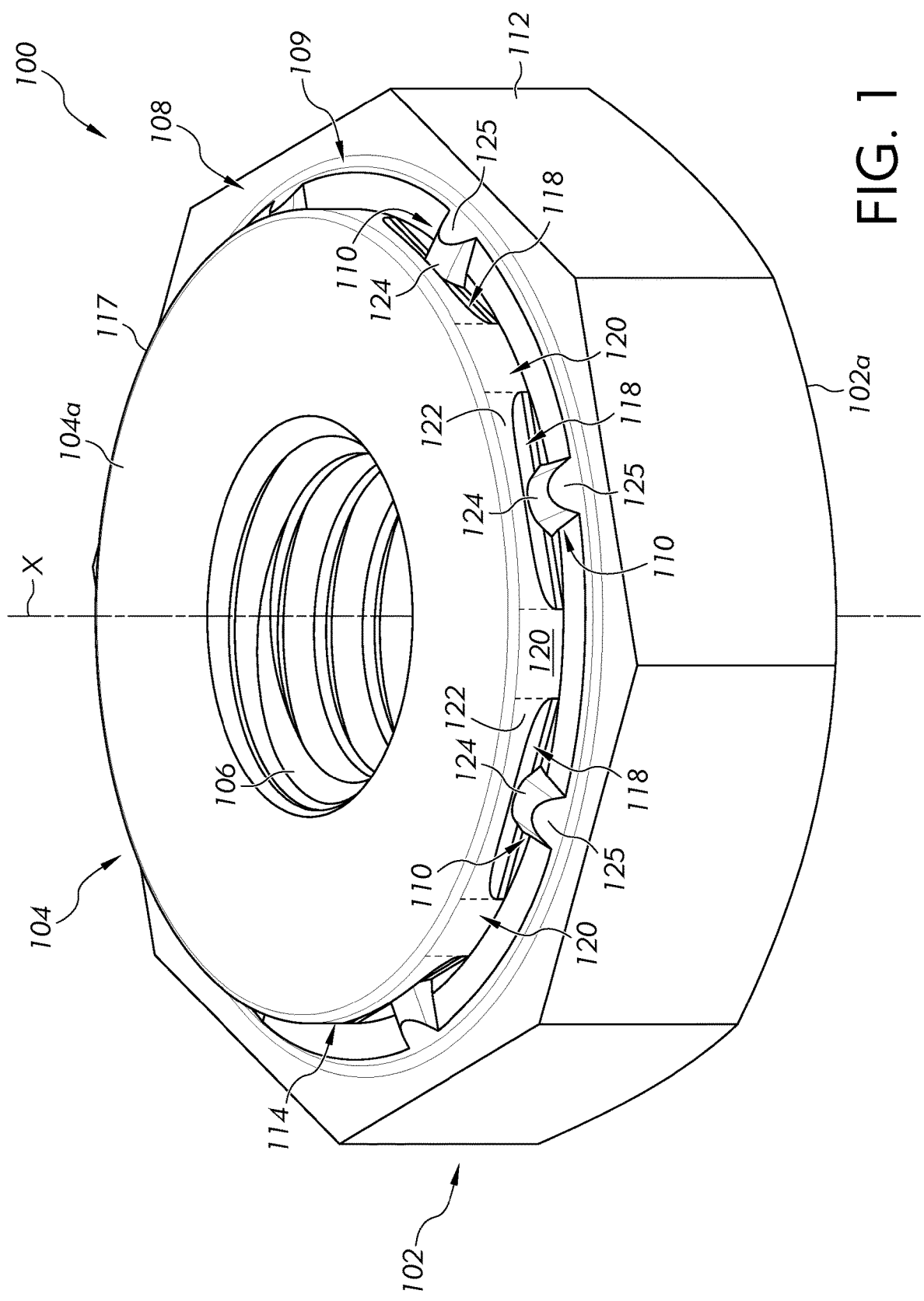
FIG. 1 is a perspective view of a clinch nut.
Figure 6:
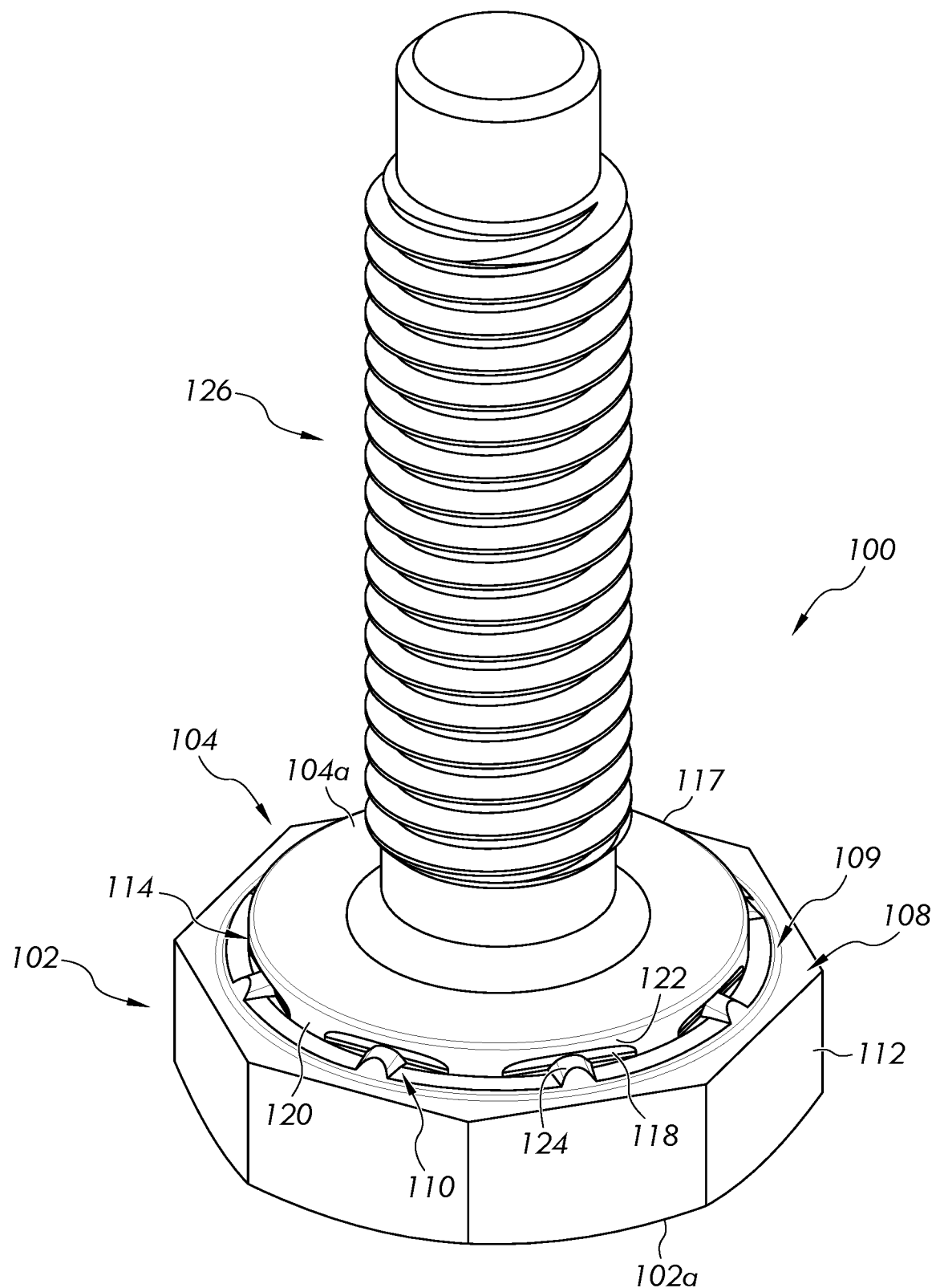
FIG. 6 is a perspective view of a stud including a clinch mounting portion as shown in FIG. 1.

Referring now to the drawings, FIG. 1 depicts a fastener 100 or nut for attachment to a plastically deformable metal plate or panel. The fastener 100 may be a self-clinching fastener that, during installation to the metal panel, clinches and attaches to a pre-made hole formed in the metal panel. Preferably, the fastener 100 is a self-piercing and self-clinching fastener that, during installation, both pierces an aperture in the metal panel and clinches itself thereto. It is noted that while the illustrated embodiment is a nut, other self-piercing and self-clinching fasteners such as, for example, self-piercing and/or self-clinching studs (depicted in FIG. 6, and briefly discussed below) are within the scope of the present invention. For brevity, a majority of the below-description will be made with respect to a self-clinching and self-piercing nut, with the understanding that this disclosure likewise applies to self-piercing and/or self-clinching studs.

The fastener 100 has a body portion 102 and a pilot or punch portion 104 extending from one end of the body portion 102. A threaded hole or bore 106 axially extends through both the body portion 102 and the punch portion 104. Further, the body portion 102 and the punch portion 104 are coaxial with a central axis "X." Upon installation of the fastener 100 to a plastically deformable metal substrate, a mating, threaded fastener (e.g., a bolt, screw, etc.) can be inserted in the threaded bore 106 for attachment thereto. Where the fastener is a self-piercing and self-clinching stud, the punch portion 104 can be solid and contain no through hole; instead, a threaded or non-threaded stud can extend outwards from the opposite side of the body portion 102 (i.e., from bottom or first end surface 102a of the fastener 100). Preferably such a stud is located centrally and co-axially with the central axis "X." The stud could be perpendicular to the first end surface 102a, or may be positioned at an angle relative to the central axis "X," as desired.

Figure 2:
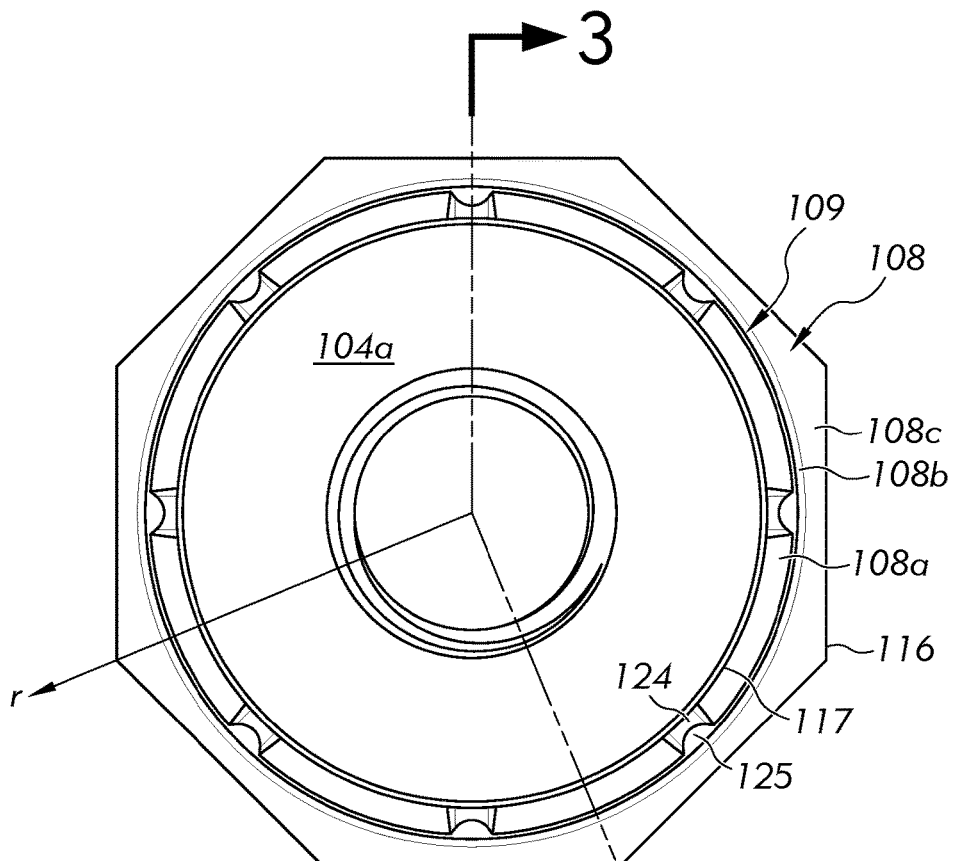
FIG. 2 is a top view of the clinch nut depicted in FIG. 1.
Figure 3:
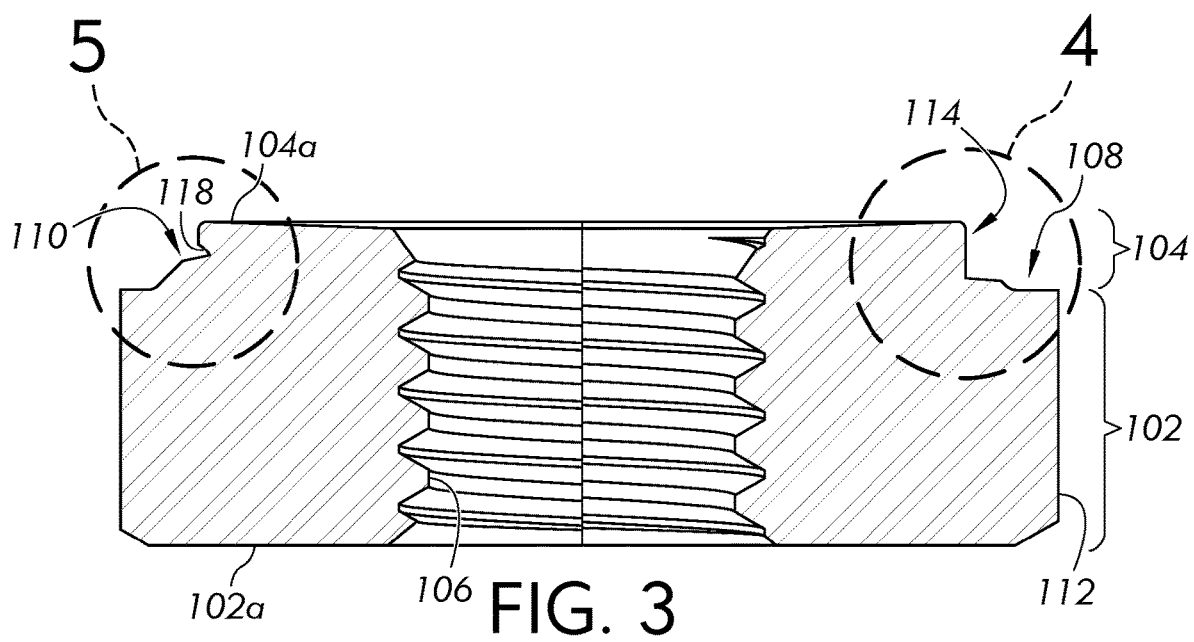
FIG. 3 is a sectional view taken along the line 3-3 in FIG. 2.

With reference to FIGS. 1-3, the body portion 102 extends to the bottom or first end surface 102a of the fastener 100, corresponding to one axial extremity of the fastener 100. The first end surface 102a of the fastener 100 is shown as being substantially perpendicular to the central axis "X." However, the first end surface 102a may have other geometric configurations; for example, the first end surface 102a may be chamfered. Specifically, the first end surface 102a may be inclined or declined with respect to the central axis "X." Said differently, the first end surface 102a may have a circumferential face that gradually converges radially inwards or diverges radially outwards with respect to an installation direction of the fastener 100. As is further shown, the punch portion 104 extends to a top or second end surface 104a of the fastener 100, corresponding to the other axial extremity of the fastener 100. The second end surface 104a of the fastener 100 is likewise depicted as being substantially perpendicular to the central axis "X," however, the second end surface 104a could alternatively be chamfered, as described above with respect to the first end surface 102a.

The punch portion 104 is radially smaller than the body portion 102 such that the body portion 102 includes a generally annular-shaped surface 108 encircling the punch portion 104. That is, the punch portion 104 extends from the body portion 102 in a direction of the central axis "X," and is positioned such that the annular-shaped surface 108 encircles the punch portion 104. The annular-shaped surface 108 extends in a direction perpendicular to the central axis (i.e., extending in a radial direction "r" of the fastener 100, as shown in FIG. 2) and is configured to engage the metal panel to which the fastener 100 is to be attached to.

As is further shown, the fastener 100 includes a plurality of spaced apart lugs 110 that collectively encircle the punch portion 104. Each of the lugs 110 axially projects outward from the annular-shaped surface 108 in a direction opposite to the first end surface 102a of the fastener 100. In one embodiment, as shown, the plurality of lugs 110 are equally spaced apart, one from the other, and all have the same configuration. Alternatively, the plurality of lugs 110 can be unequally spaced apart about the punch portion 104, one from the other, and/or can have varying configurations.

With respect to FIGS. 1 and 3, the body portion 102 and punch portion 104 include outer peripheral surfaces 112, 114, respectively, that extend in a direction of the central axis "X." In one embodiment, the outer peripheral surface 112 of the body portion 102 is planar and parallel with respect to the central axis "X" to provide a polygonal shape having flat sides which can be readily used by machine tools. Alternatively, the outer peripheral surface 112 of the body portion 102 may be curved with a convex or concave shape and/or non-parallel with respect to the central axis "X." In the shown example, the outer peripheral surface 112 of the body portion 102 is polygonal-shaped and is formed by a plurality of faces. Specifically, the plurality of faces all have the same dimensions (i.e., height and width) such that the outer peripheral surface 112 of the body portion 102 is formed by eight faces, as shown in FIG. 2. Alternatively, a total of four to twelve faces may form the outer peripheral surface 112 of the body portion 102. It is further noted that the outer peripheral surface 112 of the body portion 102 need not be polygonal-shaped, and may have other geometric configurations (e.g., cylindrical). The height (i.e., the axial dimension) and width (i.e., the radial dimension) of the body portion 102 are selected to provide sufficient thread engagement between the threaded bore 106 and the mating externally threaded member (e.g., a bolt) such that the mating externally threaded member may consistently engage with and break from the threaded bore 106, without stripping the threads. Where the fastener 100 has a self-clinching stud, the height and width of the body portion 102 can be likewise selected to provide sufficient strength for the stud and any intended mating fasteners.

Figure 4:
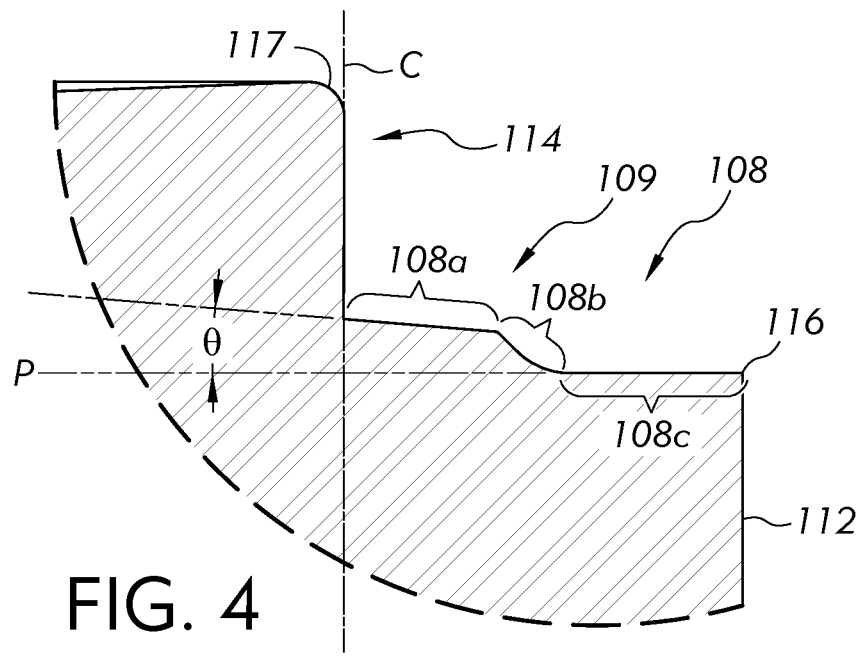
FIG. 4 is an enlarged view of detail area "4" depicted in FIG. 3.

With reference to FIGS. 2 and 4, FIG. 4 being an enlarged detail view of an encircled area of the fastener 100 depicted in FIG. 3, the annular-shaped surface 108 lies on an imaginary horizontal plane "P." Specifically, the imaginary horizontal plane "P" is configured such that the central axis "X" is normal thereto. Further, the annular-shaped surface 108 comprises a first annular face 108a, a second annular face 108b, and a third annular face 108c. The first annular face 108a is encircled by the second annular face 108b (i.e., the first annular face 108a is positioned radially closer to the punch portion 104 than the second annular face 108b), and the second annular face 108b is encircled by the third annular face 108c (i.e., the second annular face 108b is positioned radially closer to the punch portion 104 than the third annular face 108c). Said differently, the first, second, and third annular faces 108a, 108b, 108c are concentrically arranged, wherein the second annular face 108b is intermediately disposed between the first and third annular faces 108a, 108c in the radial direction "r." Notably, each of the first, second, and third annular faces 108a, 108b, 108c continuously encircles (i.e., radially surrounds) the punch portion 104 in an uninterrupted manner. However, it is contemplated that at least one of the first, second, and/or third annular faces 108a, 108b, 108c can have separate (i.e., discontinuous) circumferential sections that collectively encircle the punch portion 104.

As shown in FIG. 4, an outer radius (with respect to the central axis "X") of the third annular face 108c meets with (i.e., intersects) the outer peripheral surface 112 of the body portion 102 at a peripheral edge 116 of the annular-shaped surface 108. That is, the outer radius of the third annular face 108c is coterminous with the body portion 102 at the peripheral edge 116. An inner radius (with respect to the central axis "X") of the third annular face 108c meets with an outer radius (with respect to the central axis "X") of the second annular face 108b. Further, an inner radius (with respect to the central axis "X") of the second annular face 108b meets with an outer radius (with respect to the central axis "X") of the first annular face 108a, and an inner radius (with respect to the central axis "X") of the first annular face 108a meets with (i.e., intersects) the outer peripheral surface 114 of the punch portion 104.

As further shown, the third annular face 108c is planar (i.e., flat) and lies on the imaginary horizontal plane "P." Moreover, the first annular 108a is planar (i.e., flat) in cross-section and is angled with respect to the imaginary horizontal plane "P." Specifically, the first annular face 108a can be convex shaped with respect to the imaginary horizontal plane "P." That is, the first annular face 108a inclines, relative to the imaginary horizontal plane "P," in a radially inwards direction of the fastener 100. The first annular face 108a has a convex angle θ (i.e., an angle less than 180°, with respect to the imaginary horizontal plane "P"), as shown in FIG. 4.

This convex angle θ provides the technical advantage of generating a suitable surface to which the metal panel can engage with during attachment. Specifically, conventional fasteners have a concave angle provided between an annular-shaped surface and an imaginary horizontal plane. Such a configuration is acceptable for previously configured metal panels. However, metal panels are now being manufactured from new, lightweight materials (e.g., aluminum, steel, etc.) that are enhanced (e.g., heat treated) to provide improved strength qualities. While these new metal panels are thinner, lighter and stronger, the relatively harder substrates of such metal panels permit less material elongation during installation. That is, the substrate (i.e., the metal panel) does not flow (i.e., plastically deform) easily during fastener installation, thus resulting in gaps (i.e., empty spaces) forming between the punch portion and/or annular-shaped surface, and the mating substrate (i.e., the metal panel). These gaps or voids deteriorate the attachment strength between the fastener and the metal panel, ultimately yielding an unsatisfactory joint connection therebetween. The fastener 100 configuration discussed herein, and specifically the configuration of the above-noted convex angle, greatly reduces or even eliminates the potential voids formed between the fastener 100 and the metal panel. That is, the substrate no longer needs to flow into an undercut region formed via an angle between the annular-shaped surface and the outer peripheral edge of the punch portion.

As shown, the first annular face 108a does not continuously decline from the outer peripheral surface 114 of the punch portion 104 to the third annular face 108c. Rather, as noted above, the second annular face 108b is disposed (radially) between the first and third annular faces 108a, 108c and gradually curves downward (i.e., towards the imaginary horizontal plane "P") in the radial direction "r." That is, the second annular face 108b follows a radius of curvature, in cross-section, to connect the outer radius of the first annular face 108a and the inner radius of the third annular face 108c. Accordingly, because of the above-noted curved-design, the second annular face 108b has a concave shape, in cross-section.

Notably, providing the curved, second annular face 108b between the planar (in cross-section), first and third annular faces 108a, 108c reduces the radial footprint of the first annular face 108a. That is, the first annular face can retain the convex angle θ from the imaginary horizontal plane "P," while not needing to continuously decrease thereto. Rather, the curved, second annular face 108b provides a smooth/efficient transition between the first and third annular faces 108a, 108c.

Figure 7:
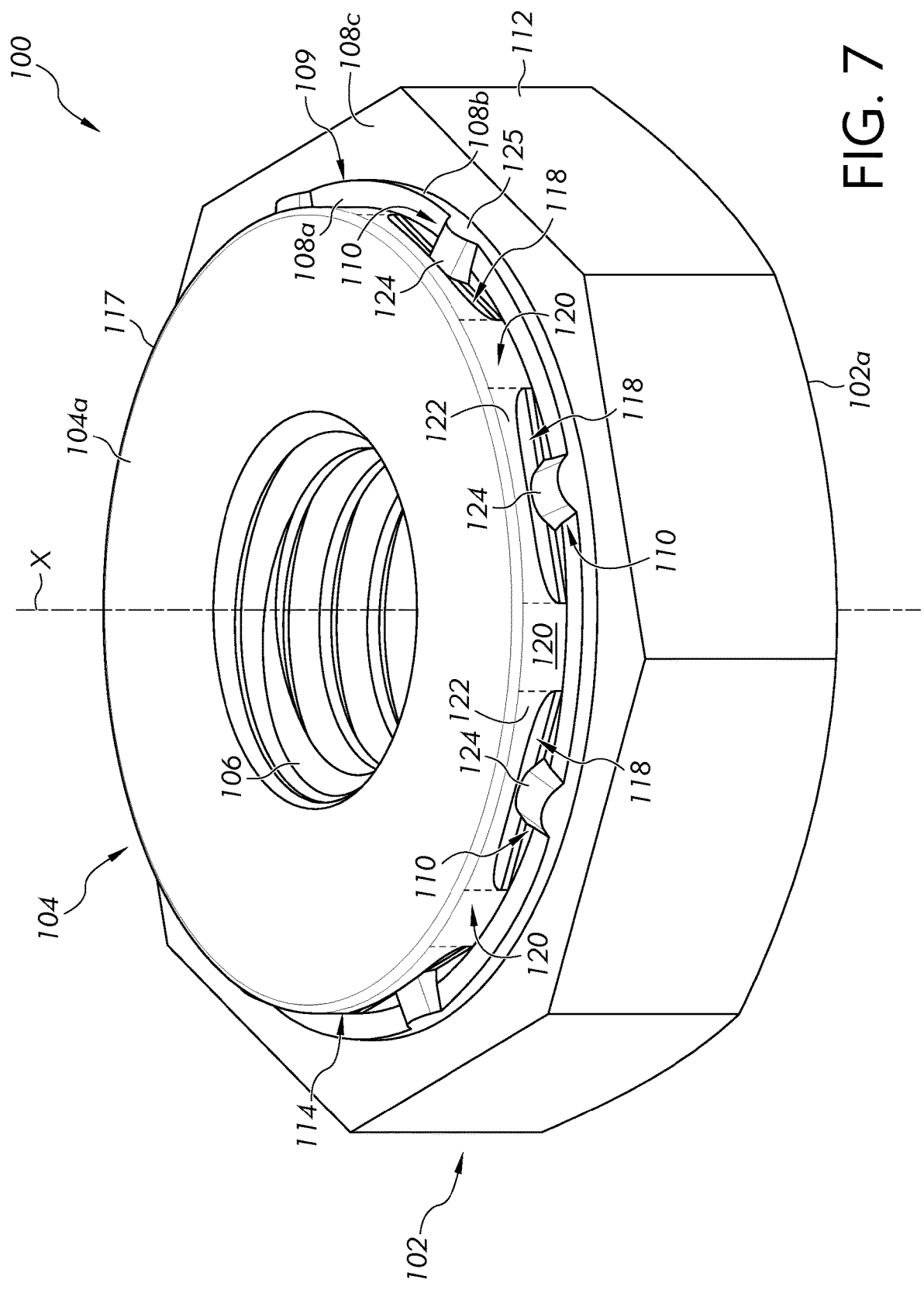
FIG. 7 is a perspective view of an alternative clinch nut.

With this said, it is to be understood that the second annular face 108b can have a cross-sectional configuration other than curved. For example, the second annular face 108b can be planar (i.e., flat) in cross-section and angled with respect to the imaginary horizontal plane "P." In another example (e.g., as shown in FIG. 7, discussed further below), the second annular face 108b can be planar (i.e., flat) in cross-section and arranged perpendicular to the third annular face 108c (i.e., perpendicular to the imaginary horizontal plane "P").

Figure 5:
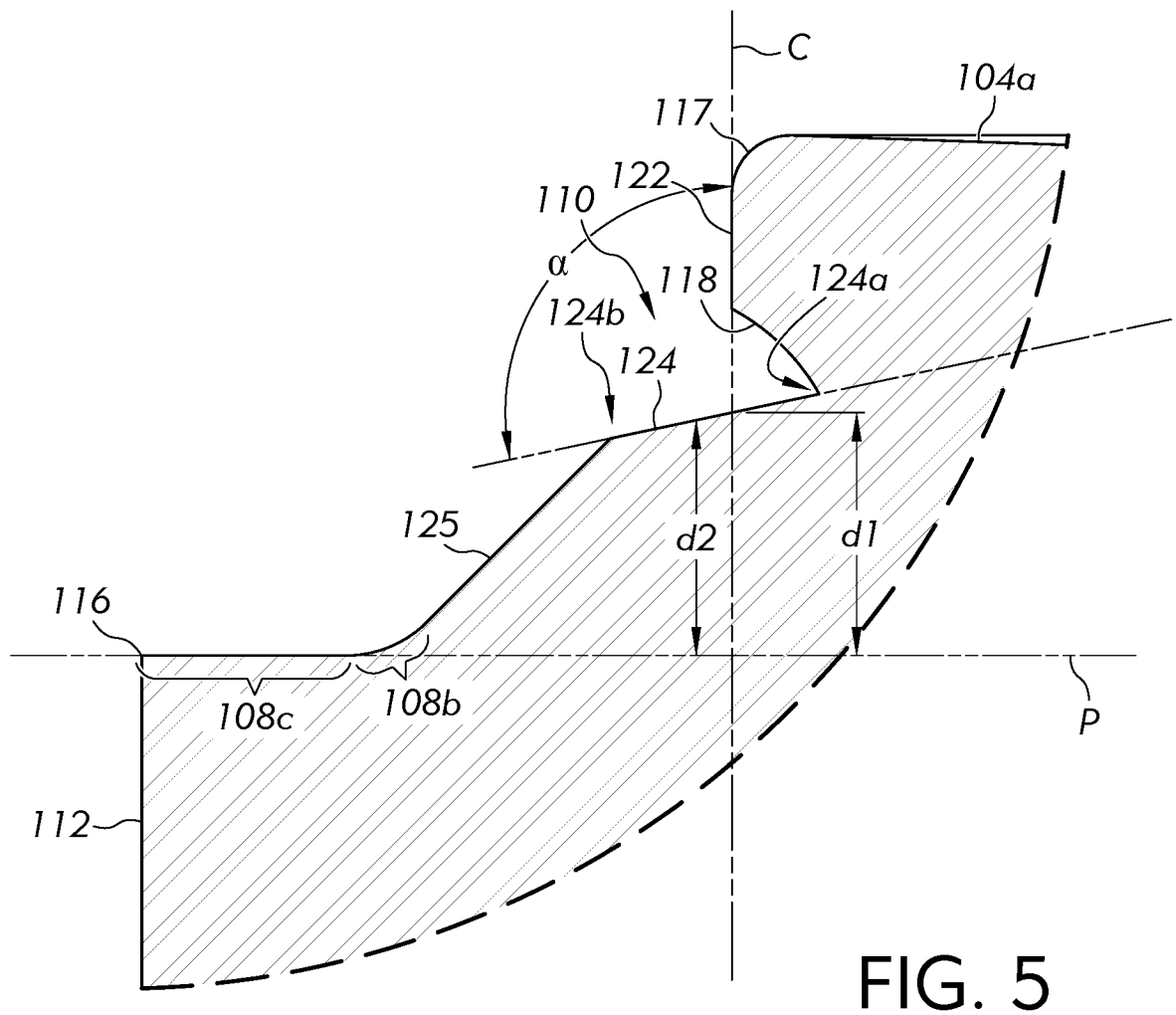
FIG. 5 is an enlarged view of detail area "5" depicted in FIG. 3.

In sum, the first and second annular faces 108a, 108b define a rim 109 of the annular-shaped surface 108 that projects axially outwards and away from the imaginary horizontal plane "P" and towards the second end surface 104a of the fastener 100 along the central axis "X." Moreover, the rim 109 radially projects outwards from the outer peripheral surface 114 of the punch portion 104 (e.g., an imaginary circumferential plane "C," shown in FIG. 5).

Moving back to FIG. 1, the outer peripheral surface 114 of the punch portion 104 extends in the direction of the central axis "X" between the annular-shaped surface 108 of the body portion 102 and a distal peripheral edge 117 of the punch portion 104 (i.e., an edge where the second end surface 104a and the outer peripheral surface 114 of the punch portion 104 intersect). Notably, the height of the punch portion 104 is less than the height of the body portion 102. Further, the outer peripheral surface 114 of the punch portion 104 has a cylindrical profile. That is, the outer peripheral surface 114 of the punch portion 104 preferably has radiused corners which collectively yield a rounded surface. Said differently, the outer peripheral surface 114 preferably has no sharp edges that extend beyond an imaginary circumferential plane "C" (e.g., shown in FIG. 5) that bounds (i.e., encircles) the outer peripheral surface 114 of the punch portion 104.

The outer peripheral surface 114 of the punch portion 104 having a cylindrical profile with no sharp edges greatly reduces or even eliminates the potential for imperfections (e.g., cracking) to form in the fastener 100 and/or the metal panel during installation. That is, sharp or pointed edges on the outer peripheral surface 114 of the punch portion 104 are susceptible to cracking due to the forces imparted thereon during installation. Accordingly, the fastener 100 described herein, having no sharp or pointed edges on the outer peripheral surface 114 of the punch portion 104, is removed from the above-noted problem and is less likely to yield a defective finished product.

As shown, a plurality of spaced apart cutouts 118 are formed in the outer peripheral surface 114 of the punch portion 104 and are arranged so as to collectively encircle the punch portion 104. In one embodiment, the plurality of cutouts 118 are equally spaced apart, one from the other, and all have the same configuration. Specifically, each cutout 118 has a concaved surface with respect to the outer peripheral surface 114 of the punch portion 104. Alternatively, the plurality of cutouts 118 can have varying spacing and/or configurations, such as where only one cutout 118 has a concaved surface.

The outer peripheral surface 114 of the punch portion 104 further comprises a plurality of spaced apart column portions 120, shown in FIG. 1 in dashed lines, wherein each column portion 120 is defined as an area of the cylindrically profiled outer peripheral surface 114 of the punch portion 104 between a pair of adjacently spaced cutouts 118. The plurality of spaced apart column portions 120 collectively encircle the punch portion 104, and each column portion 120 extends from the annular-shaped surface 108 to the distal peripheral edge 117 of the outer peripheral surface 114 of the punch portion 104. Specifically, each column portion 120 is disposed between and spaces apart a respective pair of adjacently spaced apart cutouts 118.

As mentioned above, in one embodiment, the plurality of cutouts 118 are shown as being equally spaced apart, one from the other. Specifically, it is the plurality of column portions 120 that provide the equal spacing between the plurality of cutouts 118. As such, the plurality of column portions 120 are likewise equally spaced, one from the other. As further mentioned above, the outer peripheral surface 114 of the punch portion 104 has a cylindrical profile with no sharp edges; this is a result of the column portions 120 being disposed between and spacing apart a respective pair of adjacently spaced apart cutouts 118. That is, if a pair of cutouts 118 were disposed directly adjacent one another, with nothing therebetween, there would be no surface having a cylindrical profile provided between the pair of adjacent cutouts 118, thus resulting in the formation of a sharp edge.

Still further, in one embodiment, the outer peripheral surface 114 of the punch portion 104 comprises a plurality of bridge portions 122 that are spaced apart, one from the other, and which collectively encircle the punch portion 104. Specifically, each bridge portion 122 is defined as an area of the cylindrically profiled outer peripheral surface 114 of the punch portion 104 disposed between a pair of adjacently spaced column portions 120. Further, each bridge portion 122 is positioned axially between the distal peripheral edge 117 of the outer peripheral surface 114 of the punch portion 104 and the cutout 118 which is bounded by the pair of adjacently spaced column portions 120. In this manner, each bridge portion 122 connects a respective pair of adjacently spaced apart column portions 120.

Moving on to FIG. 5, one of the lugs 110 has a contact face 124 with a rounded profile (as shown in FIG. 1). That is, the contact face 124 is curved (i.e., rounded laterally, side-to-side) with respect to an imaginary axis extending in the radial direction "r" of the fastener 100. Preferably, the relatively highest point of the contact face 124 (relative to the imaginary horizontal plane "P") is at its midpoint, although other geometries are contemplated. In one embodiment, the contact face 124 is configured to engage the metal panel to which the fastener 100 is to be attached to, and declines, relative to the imaginary horizontal plane "P," in a radially outwards direction of the fastener 100. As shown in the depicted embodiment, the contact face 124 declines in a continuous manner relative to the imaginary horizontal plane "P," in the radially outwards direction of the fastener 100. This specific configuration (i.e., the contact face 124 continuously declining in a radially outward direction) generates a satisfactory mating surface for the metal panel. That is, as noted above, because the substrate (i.e., the metal panel) does not flow (i.e., plastically deform) easily during installation, it is important to provide mating surfaces on a fastener that do not require the substrate to flow into cavities and/or voids. As such, the contact face 124 of the fastener 100 described herein permits the substrate to efficiently flow and mate with the annular-shaped surface 108 during installation. Moreover, the configuration of the contact face 124 (i.e., its spatial orientation and having a rounded profile) eliminates the likelihood of the lug 110 being deformed during installation.

The contact face 124 has a first end portion 124a and a second end portion 124b. The first end portion 124a is positioned adjacent the outer peripheral surface 114 of the punch portion 104 and the second end portion 124b is positioned radially outwards therefrom. Preferably, the first end portion 124a is formed with the outer peripheral surface 114 of the punch portion 104. Notably, the second end portion 124b does not extend to the outer peripheral surface 112 of the body portion 102. That is, the second end portion 124b of the contact face is not coterminous with the outer peripheral surface 112 of the body portion 102. Rather, the second end portion 124b is disposed radially between the imaginary circumferential plane "C" (i.e., that bounds the outer peripheral surface 114 of the punch portion 104) and the peripheral edge 116 of the annular-shaped surface 108.

As further shown in FIGS. 1 and 5, each lug 110 has an outer face 125 (distal from the punch portion 104) that tapers towards the imaginary horizontal plane "P" in the radially outwards direction. Similar to the contact face 124, the outer face 125 of the lug 110 does not extend to the outer peripheral surface 112 of the body portion 102. Rather, the outer face 125 extends from the second end portion 124b of the contact face 124 to the second annular face 108b of the rim 109. Notably, in one embodiment, the outer face 125 of the lug 110 continuously declines, relative to the imaginary horizontal plane "P," in the radially outwards direction and has an inclination angle that permits a distal end of the outer face 125 to smoothly transition with the inner radius of the second annular face 108b. Moreover, in contrast to the contact face 124, the outer face 125 of the lug 110 is planar (e.g., as shown in FIG. 1). That is, the outer face 125 is not curved (i.e., rounded laterally, side-to-side) with respect to an imaginary axis extending in the radial direction "r" of the fastener 100. However, it is contemplated that the outer face 125 may have a surface profile other than planar.

As noted above, in one embodiment the contact face 124 continuously declines, relative to the imaginary horizontal plane "P," in a radially outwards direction of the fastener 100. This is a result of a surface of the contact face 124, at the first end portion 124a, being spaced a first distance d1 from the imaginary horizontal plane "P" in a direction that is normal to the imaginary horizontal plane "P," and wherein the first distance d1 is greater than any other distance (e.g., d2) between the contact face 124 and the imaginary horizontal plane "P" taken in the direction that is normal to the imaginary horizontal plane "P." As is further shown, an angle α between the contact face 124 and the outer peripheral surface 114 of the punch portion 104 is obtuse (i.e., the angle is greater than 90° and smaller than 180°).

In one embodiment, each of the plurality of lugs 110 can have the same configuration, as depicted in FIG. 1. As further shown, each lug 110 is radially aligned with one of the cutouts 118. In this manner, the first end portion 124a of each lug 110 is formed with the cutout 118 that said lug 110 is radially aligned with. Accordingly, the first end portion 124a of each lug 110 is radially disposed between a radial center point of the fastener 100 (i.e., the central axis "X") and the imaginary circumferential plane "C" that bounds (i.e., encircles) the outer peripheral surface 114 of the punch portion 104. Moreover, the total number of radially aligned lugs 110 and cutouts 118 can depend on the total number of faces of the outer peripheral surface 112 of the body portion 102 and can each be radially aligned therewith. That is, for example, in FIGS. 1 and 2, the fastener 100 comprises a total of eight faces that collectively construct the outer peripheral surface 112 of the body portion 102. In this manner, the fastener 100 further comprises a total of eight lugs 110 and cutouts 118, each, that are radially aligned with a respective one of the eight faces that makes up the outer peripheral surface 112 of the body portion 102. Alternatively, the total number of lugs 110 can be different than the total number of cutouts 118 and/or faces of the outer peripheral surface 112 of the body portion 102. Moreover, the lugs 110, cutouts 118 and/or the faces of the outer peripheral surface 112 of the body portion 102 need not be radially aligned. For example, one lug 110 could be radially aligned with an edge formed between a pair of adjacent faces of the outer peripheral surface 112 of the body portion 102.

All of the components of the above-discussed fastener 100, specifically the body portion 102, the punch portion 104, the rim 109, and the lug(s) 110, are formed integrally with respect to one another. That is, the body portion 102, the punch portion 104, the rim 109, and the lug(s) 110 are all formed from the same stock material. However, the material selection is not limited thereto, and other suitable materials may be used. Furthermore, it is preferable for the material of the fastener 100 to have a hardness greater than that of the metal panel to which it is to be attached to. Where the fastener is a self-clinching stud, the stud would likewise be integrally formed of the same material.

Notably, the aforementioned configuration of the fastener 100 provides an improvement in that tooling longevity is increased, and cost-savings occurs at the manufacturing level, which can trickle down to the consumer. Specifically, as noted above, the rim 109 of the annular-shaped surface 108 and the lugs 110 not extending radially outwards to the outer peripheral surface 112 of the body portion 102 helps the material of the substrate (i.e., the metal panel) to flow (i.e., plastically deform) in comparison to conventional fastener designs. In particular, the specific configuration of the rim 109 and the lugs 110, as noted above, enhances flow of the material such that up to a 50% reduction of force or possibly even more (during installation) is observed in comparison to conventional designs. Moreover, the use of a reflective die is no longer necessary. Rather, a flat (i.e., planar) die can be used simply as a backstop during installation to reduce potential wear points on the tooling. More specifically, the general weak-point of conventional reflective dies (i.e., the ridge) has been removed, wherein the function of that ridge has been incorporated into the fastener 100 via the configuration of the rim 109. That is, the rim 109 provides the same technical advantage as the aforementioned ridge, but is formed as part of the fastener 100 itself (as opposed to the die), and thus is only used a single time. Accordingly, because the die is planar (i.e., no longer being a reflective die having a ridge) and is provided as a backstop, the flat die has a greatly increased lifespan of 5x-50x over conventional manufacturing die life, which is a significant improvement due to the new fastener design herein. Accordingly, cost-savings occurs during manufacturing as tooling longevity has increased.

As briefly noted above and with respect to FIG. 6, the fastener 100 may be a self-piercing and/or self-clinching stud. In such a configuration, the fastener 100 comprises the body portion 102 and the punch portion 104. A shank 126 extends outwards from the second end surface 104a of the fastener 100 along the central axis "X." In other examples, the shank 126 may extend outwards from the first end surface 102a of the fastener 100 along the central axis "X." As shown, at least a portion of the shank 126 may be threaded. Alternatively, the shank 126 may not be threaded.

Briefly moving on to FIG. 7, an alternative fastener 100 is shown. As mentioned above, the second annular face 108b of the annular-shaped surface 108 need not have a radius of curvature. Rather, the second annular face 108b can be linear in cross-section and extend perpendicularly to the imaginary horizontal plane "P." Alternatively, it is contemplated that the second annular face 108b can be linear in cross-section and be oriented at an angle (other than) 90° with respect to the imaginary horizontal plane "P." As further shown in FIG. 7, the outer face 125 of each lug 110 can have the same orientation as the second annular face 108b with respect to the imaginary horizontal plane "P." Specifically, as shown, the outer face 125 extends perpendicularly to the imaginary horizontal plane "P" and is coincident with the second annular face 108b. However, it is contemplated that the outer face 125 can be oriented at an angle (other than 90°) with respect to the imaginary horizontal plane "P."

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A self-clinching fastener for attachment to a plastically deformable metal substrate, the self-clinching fastener comprising:

a body portion with a central axis, the body portion including an outer peripheral surface extending in a direction of the central axis, and an annular-shaped surface extending in a direction perpendicular to the central axis, wherein the annular-shaped surface includes a first annular face, a second annular face, and a third annular face, the third annular face lying on an imaginary horizontal plane, and the first and second annular faces defining a rim that projects away from the imaginary horizontal plane in the direction of the central axis;

a punch portion being coaxial with the central axis and extending from the body portion such that the annular-shaped surface encircles the punch portion, the punch portion including an outer peripheral surface extending in the direction of the central axis; and a plurality of spaced apart lugs encircling the punch portion and axially projecting outwards from the annular-shaped surface, one of the lugs declining, relative to the imaginary horizontal plane, in a radially outwards direction of the self-clinching fastener, wherein the first annular face extends from the outer peripheral surface of the punch portion in the radially outwards direction, wherein the second annular face is radially disposed between the first annular face and the third annular face, and wherein said one of the lugs declines to the second annular face such that a radially outer end of said one of the lugs is coterminous with the second annular face.

2. The self-clinching fastener of claim 1, wherein an inner radius of the first annular face intersects with the outer peripheral surface of the punch portion, wherein an outer radius of the first annular face intersects with an inner radius of the second annular face, and wherein an outer radius of the second annular face intersects with an inner radius of the third annular face.

3. The self-clinching fastener of claim 2, wherein the first annular face is planar in cross-section and is angled with respect to the imaginary horizontal plane, and wherein the second annular face is curved in cross-section such that the second annular face continuously curves towards the imaginary horizontal plane in the radially outwards direction.

4. The self-clinching fastener of claim 1, wherein the second annular face has a concave shape, in cross-section.

5. The self-clinching fastener of claim 1, said one of the lugs including a contact face having a first end portion and a second end portion, the first end portion being positioned adjacent the outer peripheral surface of the punch portion and the second end portion being positioned radially outwards therefrom.

6. A self-clinching fastener for attachment to a plastically deformable metal substrate, the self-clinching fastener comprising:
  a body portion with a central axis, the body portion including an outer peripheral surface extending in a direction of the central axis, and an annular-shaped surface extending in a direction perpendicular to the central axis, wherein the annular-shaped surface includes a first annular face, a second annular face, and a third annular face, the third annular face lying on an imaginary horizontal plane, and the first and second annular faces defining a rim that projects away from the imaginary horizontal plane in the direction of the central axis;
  a punch portion being coaxial with the central axis and extending from the body portion such that the annular-shaped surface encircles the punch portion, the punch portion including an outer peripheral surface extending in the direction of the central axis; and
  a plurality of spaced apart lugs encircling the punch portion and axially projecting outwards from the annular-shaped surface, one of the lugs declining, relative to the imaginary horizontal plane, in a radially outwards direction of the self-clinching fastener,
  wherein the first annular face extends from the outer peripheral surface of the punch portion in the radially outwards direction, wherein the second annular face is radially disposed between the first annular face and the third annular face, and wherein said one of the lugs declines to the second annular face,
  wherein said one of the lugs includes a contact face having a first end portion and a second end portion, the first end portion being positioned adjacent the outer peripheral surface of the punch portion and the second end portion being positioned radially outwards therefrom, and
  wherein the punch portion has a cylindrical profile that resides on an imaginary circumferential plane, wherein the first end portion is positioned radially between the central axis and the imaginary circumferential plane, and the second end portion is positioned radially outwards from the imaginary circumferential plane, and wherein the contact face continuously declines from the first end portion to the second end portion.

7. The self-clinching fastener of claim 5, said one of the lugs further including an outer face that continuously tapers towards the imaginary horizontal plane in the radially outwards direction.

8. The self-clinching fastener of claim 7, wherein said outer face extends from the second end portion of the contact face to the second annular face.

9. The self-clinching fastener of claim 8, wherein the contact face has a rounded profile, and wherein the outer face has a planar profile.

10. The self-clinching fastener of claim 1, wherein a threaded through-hole is formed in at least one of the body portion and the punch portion.

11. The self-clinching fastener of claim 1, wherein neither the rim nor said one of the lugs is coterminous with the outer peripheral surface of the body portion.

12. The self-clinching fastener of claim 1, the outer peripheral surface of the punch portion having a cylindrical profile and comprising:
  a plurality of spaced apart cutouts encircling the punch portion; and
  a plurality of spaced apart column portions encircling the punch portion, wherein each of the column portions is disposed between and spaces apart a respective pair of adjacently spaced apart cutouts.

13. The self-clinching fastener of claim 12, wherein each column portion extends from the rim to a distal peripheral edge of the outer peripheral surface of the punch portion.

14. The self-clinching fastener of claim 13, the outer peripheral surface of the punch portion further comprising a plurality of bridge portions encircling the punch portion, wherein each bridge portion connects a respective pair of adjacently spaced apart column portions.

15. The self-clinching fastener of claim 14, wherein each bridge portion is positioned axially between the distal peripheral edge of the outer peripheral surface of the punch portion and a respective cutout of the plurality of cutouts.

16. The self-clinching fastener of claim 14, wherein a threaded through-hole is formed in at least one of the body portion and the punch portion.

17. A self-clinching fastener for attachment to a plastically deformable metal substrate, the self-clinching fastener comprising:
  a body portion with a central axis, the body portion including an outer peripheral surface extending in a direction of the central axis, and an annular-shaped surface extending in a direction perpendicular to the central axis, wherein the annular-shaped surface includes a first annular face, a second annular face, and a third annular face, the third annular face lying on an imaginary horizontal plane, and the first and second annular faces defining a rim that projects away from the imaginary horizontal plane in the direction of the central axis;
  a punch portion being coaxial with the central axis and extending from the body portion such that the annular-shaped surface encircles the punch portion, the punch portion including an outer peripheral surface extending in a direction of the central axis and having a cylindrical profile that resides on an imaginary circumferential plane; and
  a plurality of spaced apart lugs encircling the punch portion and axially projecting outwards from the annular-shaped surface, one of the lugs declining, relative to the imaginary horizontal plane, in a radially outwards direction of the self-clinching fastener, wherein the first annular face extends from the outer peripheral surface of the punch portion in the radially outwards direction, wherein the second annular face is radially disposed between the first annular face and the third annular face, wherein the first annular face is planar in cross-section and is angled with respect to the imaginary horizontal plane, and wherein the second annular face has a concave shape in cross-section such that the second annular face continuously curves towards the imaginary horizontal plane in the radially outwards direction, and wherein said one of the lugs declines to the second annular face.

18. The self-clinching fastener of claim 17, said one of the lugs including a contact face having a first end portion and a second end portion, wherein the first end portion is positioned radially between the central axis and the imaginary circumferential plane, and the second end portion is positioned radially outwards from the imaginary circumferential plane, and wherein the contact face continuously declines from the first end portion to the second end portion.

19. The self-clinching fastener of claim 18, said one of lugs further including an outer face that continuously tapers from the second end portion of the contact face to the second annular face.

20. The self-clinching fastener of claim 19, wherein neither the rim nor said one of the lugs is coterminous with the outer peripheral surface of the body portion.

* * * * *